United States Patent
Silverbrook et al.

(10) Patent No.: US 6,826,547 B1
(45) Date of Patent: Nov. 30, 2004

(54) PRINTER SERVICE DENIAL

(75) Inventors: Kia Silverbrook, Balmain (AU); Paul Lapstun, Rodd Point (AU)

(73) Assignee: Silverbrook Research Pty Ltd., Balmain (AU)

( * ) Notice: Subject to any disclaimer, the term of this patent is extended or adjusted under 35 U.S.C. 154(b) by 516 days.

(21) Appl. No.: 09/721,861

(22) Filed: Nov. 25, 2000

(30) Foreign Application Priority Data

Feb. 24, 2000 (AU) .............................................. PQ5829

(51) Int. Cl.[7] .............................................. G06F 17/60
(52) U.S. Cl. .............................. 705/77; 705/1; 705/10; 705/14; 705/35; 705/39; 705/44; 705/27; 380/1; 347/1
(58) Field of Search ................................ 705/1, 27, 77, 705/14, 10, 35, 39, 44; 347/1; 380/1

(56) References Cited

FOREIGN PATENT DOCUMENTS

DE 1241601 A1 * 3/2001 ........... G06F/17/60

OTHER PUBLICATIONS www.lucent.com/livelink/ 090094038000f26d__Brochure__datasheet.pdf.*

* cited by examiner

Primary Examiner—James P. Trammell
Assistant Examiner—John Winter

(57) ABSTRACT

In a system in which a user obtains documents, a method of controlling what is supplied to the user, the method including providing one or more user accounts for the user and providing the or each user account with a separate first threshold, periodically determining the balance in the user account or accounts; and if the balance in the respective user account is below the first threshold, instituting modification of documents supplied or restrictions on what documents are supplied or both.

36 Claims, 1 Drawing Sheet

PRINTER SERVICE DENIAL

CO-PENDING APPLICATIONS

Various methods, systems and apparatus relating to the present invention are disclosed in the following co-pending applications filed by the applicant or assignee of the present invention simultaneously with the present invention:

Ser. Nos. 09/721,895, 09/721,894, 09/722,174, 09/721,896, 09/722,148, 09/722,146, 09/721,861, 09/721,892, 09/722,171, 09/721,858, 09/722,142, 09/722,087, 09/722,141, 09/722,175, 09/722,147, 09/722,172, 09/721,893 09/722,088, 09/721,862, U.S. Pat. No. 6,530,339 Ser. Nos. 09/721,857, 09/721,859, 09/721,860

The disclosures of these co-pending applications are incorporated herein by cross-reference.

Various methods, systems and apparatus relating to the present invention are disclosed in the following co-pending applications filed by the applicant or assignee of the present invention on 20 Oct. 2000:

Ser. Nos. 09/693,415, 09/693,219, 09/693,280, 09/693,515, 09/693,705, 09/693,647, 09/693,690, 09/693,593, U.S. Pat. No. 6,474,888, Ser. Nos. 09/693,341, 09/696,473, 09/696,514, 09/693,301, U.S. Pat. No. 6,545,482, Ser. No. 09/693,704, U.S. Pat. Nos. 6,527,365, 6,474,773, Ser. No. 09/693,335

The disclosures of these co-pending applications are incorporated herein by reference.

Various methods, systems and apparatus relating to the present invention are disclosed in the following co-pending applications filed by the applicant or assignee of the present invention on 15 Sep. 2000:

Ser. Nos. 09/663,579, 09/669,599, 09/663,701, 09/663,640

The disclosures of these co-pending applications are incorporated herein by reference.

Various methods, systems and apparatus relating to the present invention are disclosed in the following co-pending applications filed by the apllicant or assignee of the present invention on 30 Jun. 2000:

Ser. Nos. 09/609,139, 09/608,970, 09/609,039, 09/607,852, 09/607,656, 09/609,132, 09/609,303, 09/610,095, 09/609,596, 09/607,843, 09/607,605, 09/608,178, 09/609,553, 09/609,233, 09/609,149, 09/608,022, 09/609,232, 09/607,844, U.S. Pat. No. 6,457,883, Ser. Nos. 09/608,920, 09/607,985, U.S. Pat. Nos. 6,398,332, 6,394,573, Ser. No. 09/606,999

The disclosures of these co-pending applications are incorporated herein by cross-reference.

Various methods, systems and apparatus relating to the present invention are disclosed in the following co-pending applications filed by the aplicant or assignee of the present invention on 23 May 2000:

Ser. Nos. 09/575,197, 09/575,195, 09/575,159, 09/575,132, 09/575,123, 09/575,148, 09/575,130, 09/575,165, 09/575,153, 09/575,118, 09/575,131, 09/575,116, 09/375,144, 09/575,139, 09/575,186, 09/575,185, 09/575,191, 09/575,145, 09/575,192, 09/575,181, 09/575,193, 09/575,156, 09/575,183, 09/575,160, 09/575,150, 09/575,169, 09/575,184, U.S. Pat. Nos. 6,502,614, Ser. Nos. 09/575,180, 09/575,149, U.S. Pat. No. 6,549,935, Ser. No. 09/575,187, 09/575,155, 09/575,133, U.S. Pat. No. 6,439,706, Ser. No. 09/575,196, 09/575,198, 09/575,178, U.S. Pat. No. 6,428,155, Ser. No. 09/575,146, 09/575,174, 09/575,163, 09/575,168, 09/575,154, 09/575,129, 09/575,124, 09/575,188, 09/575,189, 09/575,162, 09/575,172, 09/575,170, 09,1575,171, 09/575,161, 09/575,141, 09/575,125, 09/575,142, 09/575,140, U.S. Pat. No. 6,540,319, Ser. Nos. 09/575,138, 09/575,126, 09/575,127, U.S. Pat. Nos. 6,383,833, 6,464,332, Ser. Nos. 09/575,147, 09/575,152, U.S. Pat. Nos. 6,328,417, 6,409,323, Ser. No. 09/575,114, 09/575,113, 09/575,112, U.S. Pat. No. 6,488,422, Ser. Nos. 09/575,108, 09/575,109 09/575,110 09/575,110.

The disclosures of these co-pending applications are incorporated herein by cross-reference.

TECHNICAL FIELD

This invention relates to the printers and more particularly to networked printers.

BACKGROUND ART

In our co-pending application U.S. Ser. No. 09/722,142 we have proposed a system in which a printer is connected to a network and users of the printer subscribe to publications, such as newspapers and magazines, which may be personalized for each subscriber. The publications are printed automatically on the printer. The system may also be used for other actions, such as banking and purchasing. A system is proposed in which the user does not pay all or any of the costs of the printer supplies and/or publications. Instead the cost of the publication and/or any supplies is partially or totally covered by advertising incorporated in documents printed.

DISCLOSURE OF THE INVENTION

In one broad form the invention provides in a system in which a user obtains documents, a method of controlling what is supplied to the user, the method including:

providing one or more user accounts for the user and providing the or each user account with a separate first threshold;

periodically determining the balance in the user account or accounts; and if the balance in the respective user account is below the first threshold, instituting one or both of the following:
   modification of documents supplied;
   restrictions on what documents are supplied.

The documents may be supplied electronically or by printing. Where the documents are printed, preferably the documents are printed on a user owned or user controlled printer.

The net value of each document may be positive, negative, or zero.

The restriction on documents supplied may extend to all documents, negative value documents or negative and zero value documents.

The restrictions may remain until the relevant account is above a second threshold. The second threshold may be the same as the first threshold or it may be higher.

The net value may be derived from any one or more of the following: paper cost; ink cost; adhesive cost; binding cost; data transmission cost; publisher cost; advertising credits; time of printing; day of printing; user demographics; post history or an arbitrary value.

Each user may have more than one account. Where the user has access to more than one printer there may be a separate account for each printer. Alternatively, the user may have a single account for all printers. In a further alternative, multiple accounts may be provided with one or more printers for some or all of the accounts.

Electronic delivery of documents may have a separate account or may be combined with a printer account.

The documents may be modified so as to increase the net value of some or all of the documents. Examples include adding advertising to documents which normally do not carry advertising or by increasing the ratio of advertising. The advertising ratio may be increased by increasing the amount of advertising or by decreasing the amount of not advertising material or both. The net value may be increased in other ways, such as by reducing image quality, which reduced transmission costs.

BEST MODE OF CARRYING OUT THE INVENTION

The preferred embodiment of the invention is implemented in the "netpage" system as disclosed in our co-pending application U.S. Ser. No. 09/722,142 referred to earlier. In that system printers are connected to a network and users subscribe to publications such as newspapers and magazines. The publications are printed on the printers "automatically" with network servers initiating the printing process rather than the end user. The following description is of an embodiment of the invention as used in the netpage system and for a full explanation of the netpage system reference is made to the earlier application.

Figure 1:
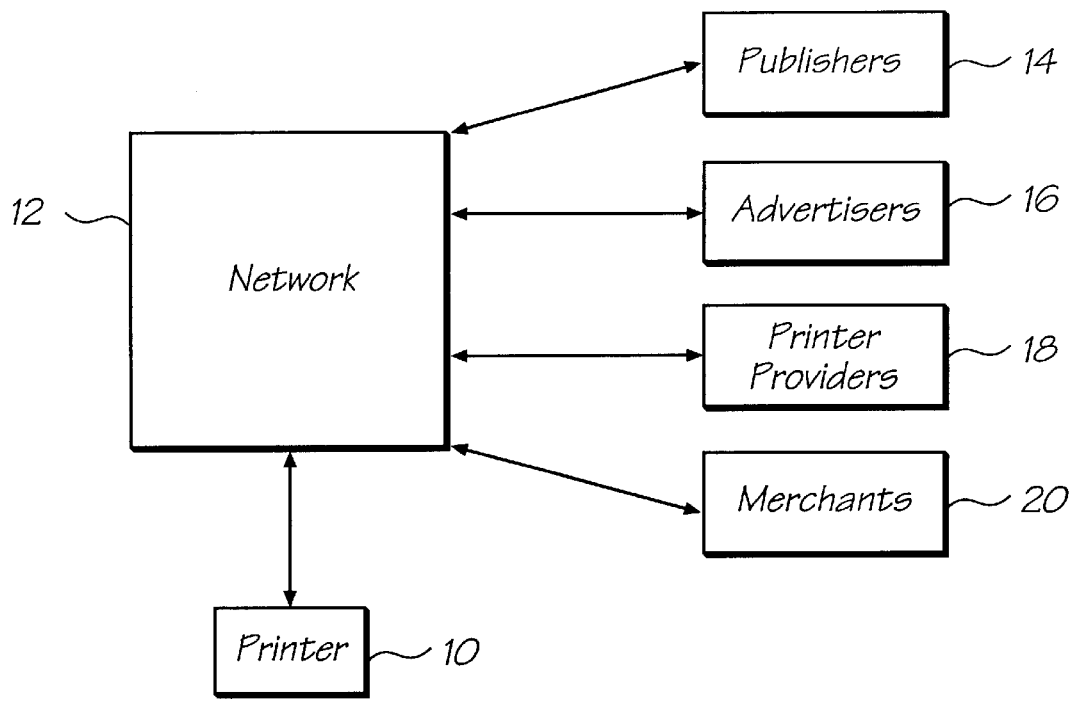
FIG. 1 shows a schematic of a network according to an embodiment of the invention.
Figure 2:
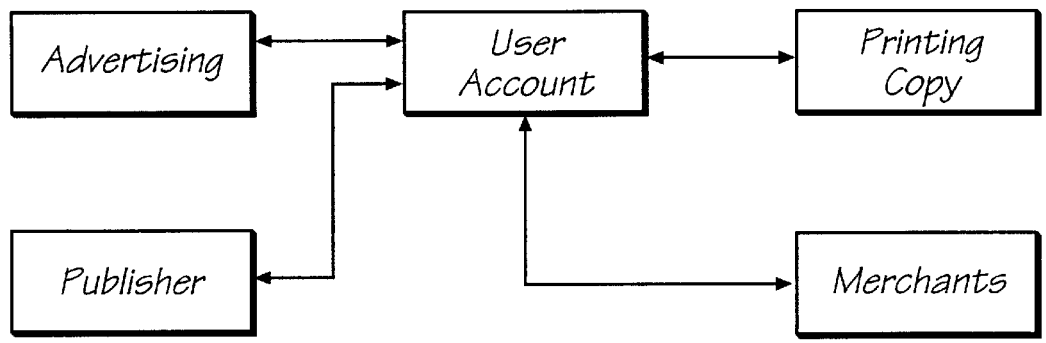
FIG. 2 is a diagram of entities involved in the network of FIG. 1.

Referring to FIGS. 1 and 2 there is shown a printer 10 connected to a network 12. The network may include publishers 14, advertisers 16, printer providers 18 and merchants 20.

Publishers need not be "traditional" publishers in the context of producing material subject to copyright for which a fee is charged for reproduction. In the netpage system it is envisaged that many different transactions, such as banking, bill payments, insurance and shopping are carried out using the netpage system. In this context, a publisher is merely the entity which creates the netpage information.

The system operates by providing each user or each user/printer combination with an account. Each account is debited and credited according to a set of arbitrary rules as devised by the network operator. The accounts may represent points or other imaginary currencies or may represent a legally recognized currency.

The user may pay a monthly access fee which is represented in the account as currency or points; there may be other periodic standing charges applied to the account.

When a page is printed by a netpage printer, a number of different debits and credits may be generated. The printing of the page may generate no debits or credits depending on the arrangement between the user or owner of the printer and the system supplier.

The following may be generated:
a) printing debits
b) network data transmission debits
c) publisher debits
d) advertising credits
e) sales credits Printing Costs The user of the printer may be explicitly liable for the true cost of any supplies used by the printer, such as ink or toner and paper used. The user may also be liable for the cost of the printer. The user may purchase the printer outright or may enter into an agreement with the network owner to pay for the printer over an agreed period. Alternatively the arrangement may be that the printer and its supplies are supplied at no explicit cost to the user.

Where the user is responsible for and pays all the costs of the printer and supplies, then any printing in and by itself will not generate a debit with the network. However, where the network is in some way involved in supplying printer supplies or maintaining the printer or "subsidizes" the printer cost or printer supplies costs, then each page printed effectively incurs a debit. This may be passed to the user or absorbed by the network owner.

Network Access and Data Transmission Costs

The user may be charged a monthly access fee to the network and may be charged for data transmitted.

For example a page of text requires less data to be transmitted than a page of images. The system may thus generate debits depending on the data transmitted.

Publisher Fee Debits

A publisher may or may not charge the user for printing documents. A bank may not charge a customer for printing a funds transfer form, but may charge for a statement printout. The bank may act as an advertising agent and include third party advertisements on its documents to offset the costs involved. A "traditional" publisher such as a newspaper or magazine publisher may charge a user for receiving the newspaper or magazine printed.

Advertising Credits

It is expected that "traditional" publications, such as newspapers and magazines will continue to carry advertising. As discussed in our co-pending application U.S. Ser. No. 09/722,142 advertising is, to some extent, controllable by the user. Any advertising printed may or may not generate a credit. This credit is preferably paid by the publisher but may be paid by the advertiser. As mentioned above, other documents may carry advertising and any publisher may provide advertising credits to users.

Advertising credits may also be generated when a user clicks on a hyperlink in the advertising material. Again the credit is preferably paid by the publisher but may be paid by the advertiser. Advertising credits are preferably generated on printing or clicking on a hyperlink, i.e. effectively instantaneously.

Sales Credits

Sales credits are generated when a user purchases a product or service via an advertisement on a printed page and obtains a credit to their account. The credit may be paid to the user by the publisher of the page which carried the advertisement by the merchant.

It will be appreciated that a single entity may constitute multiple categories of entity. For example a bank may be both a publisher and advertiser. Similarly if a user requests a product brochure from an advertiser, the advertiser is also the publisher.

Where the publisher wishes the overall "cost" to the user to be zero, this may require that the publisher generate a credit to offset any printing debits generated by a third party print provider. Alternatively the publisher may set a zero value to the document with the user paying for the printing costs directly or indirectly.

Transactions

An interaction of the various parties involved in printing of a document carrying advertising will now be described. It will be appreciated that in many cases a single page or document will carry more than one advertisement and more than one advertiser may be involved. For clarity only one advertiser is shown.

An advertiser places an advertisement with a publisher for inclusion in a publication on a page. The publisher arranges for the page to be printed for a user on a printer. The printer is supplied by a printer provider.

This leads to a number of transactions, such as charging the advertiser for the advertisement, and receiving payment from the advertiser. The user is provided with credit points for receiving the advertisement from the publisher. There may be a charge levied by the publisher for printing the document. Of course the two transactions may be combined into a single debit or credit. Where the user is responsible for printing costs, the printing debit may be zero. Where the printer and supplies are provided by the printer provider, printing generates a printing fee cost to the publisher. The printing charge charged to the user may be based on the printer provider's fee or arbitrarily set by the publisher. Of course, the printer provider and publisher may be the same entity, in which case the printing fee is really an internal cost. Depending on the rules of the system the printer provider may charge the user directly. The user may have a separate account for each printer and/or publisher or a single account.

A user may, obtain credit points for clicking on an advertisement. An advertiser places an advertisement containing a hyperlink with a publisher and the advertisement is printed on a page. The user clicks on the hyperlink which initiates a credit to the user and a debit to the advertiser. The credit is usually "paid" by the publisher but may be paid by the advertiser.

A user may obtain credit points for purchases. A merchant 51 places a hyperlink advertisement with a publisher which is printed on the page. The user clicks on the hyperlink and, in the preferred form, a merchant page is printed to enable the user to make one or more purchases. The user makes a purchase, which results in the user receiving a credit for the purchase. The credit would normally be provided by the publisher of the original page with this being covered by a sales commission from the merchant 51. Alternatively the merchant 51 may pay the credit directly to the user with a correspondingly lower sales commission.

It will be appreciated that the actions relating to advertising click through described will usually also require the advertising placement transactions and that the actions relating to purchasing a product or service will usually also require advertisement placement and click through transactions. It will be appreciated that a merchant may also be an advertiser and so takes the place of the advertiser in some of the transactions.

The invention utilizes the accounts of users to control what is printed so that the cost of the system is covered and that users are subject to some form of pricing to control usage. Depending on the document printed the net effect of all of the debits and credits may be a net debit or a net credit to the relevant account. The aim of allocating credits and debits is to encourage a user to print positive value documents or interact with documents in a way to generate positive net revenue to the publisher or network providers whilst discouraging printing of negative value documents or interaction with documents in a way which generates negative net revenue to the supplying entities. A bank transaction form in itself generates no benefit to the bank and so is a loss-making product (although when used, the transaction form may generate transaction fees which provide a net profit to the bank). In contrast, a newspaper which carries advertising is usually a profit-making product. However, the value to the user does not match the value to the supplier(s). Thus a user may use the banking forms because they are valuable but receive little material which includes revenue-generating material, such as advertising. The system thus needs mechanisms to prevent or discourage continued loss-making activities without corresponding profit-making activities. Further, the preferred form of the netpage system allows users to select the level of advertising in publications to which they subscribe, further reducing the amount of potential revenue.

The system thus has a number of modes of operation to prevent or limit loss-making activities once an account has fallen below a threshold.

Basic Service Denial

If an account falls below the threshold the system may cease to print all documents whatsoever, whether explicitly requested by the user in an on-demand situation or implicitly by the user, such as by subscription or by arranging for documents, such as bank statements, to be printed. Service would be resumed once the account was placed in credit above the threshold. The level of credit required to remove restrictions may be the same or greater than the level at which restrictions are instituted.

Partial Service Denial

Printed pages either carry a net debit or a net credit, depending on whether they generate a net loss or a net profit to the system's suppliers, although as mentioned above, user interaction with a document, such as clicking hyperlinks on advertisements or purchasing products or services may generate revenue. Once the account falls below the threshold the printing of net debit pages, such as bank statements, is prevented. However, net credit activities are allowed. By printing credit-generating documents the user generates revenue for the system providers and credits for the user, which enables printing of net debit documents once there is sufficient credit in the user's account to allow this.

Automatic Revenue Adjustment

As an alternative to preventing printing of documents the system may automatically increase the value of documents to the suppliers with a corresponding increase in net value attributed to the document. A newspaper may have the advertising to editorial ratio increased, either by reducing the amount of editorial or by increasing the amount of advertising, or both.

Where a user has multiple accounts restrictions may be implemented on an individual account basis or on a user basis. When instituted on a user basis, if one of the accounts falls below its specified threshold, then restrictions are applied to all of the user's accounts.

The preferred form of the invention results in documents being printed but it is to be appreciated that the invention is not limited to printing of documents. The invention may supply some or all documents in an electronic form to the users.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

We claim:

1. A method in a computer system for controlling the supply of a documents to a user, the system having a communication network, the document having an associated net effect, the net effect having either a positive, negative or zero value, the method including the steps of:

(a) storing on a computer readable medium at least one user account associated with the user, the at least one user account having an account balance and a first threshold;

(b) determining the balance of the at least one user account stored on the computer readable medium;

(c) if the account balance of the at least one user account stored on the computer readable medium, as determined in step (b), is equal to or greater than the first threshold, the method further includes the steps of:

(i) supplying the documents to the user via the communication network; and (ii) updating the account balance of the at least one user account based on the net effect of the document supplied;

(d) if the account balance of the at least one user account stored on the computer readable medium, as determined in step (b), is less than the first threshold, the method further includes the steps of:
  (i) determining the net effect of the document and, if the net effect of the document is negative, the method further includes the steps of:
    (I) modifying the net effect of the document such that it has either a positive or zero value;
    (II) supplying the modified document to the user via the communication network; and
    (III) updating the account balance of the at least one user account based on the net effect of the modified document supplied.

2. The method of claim 1 wherein the documents is supplied to the user in electronic form via the communication network.

3. The method of claim 1 wherein the documents is supplied to the user in printed form via at least one printer in communication with the communication network.

4. The method of claim 3 wherein the at least one printer is at least one user printer.

5. The method of claim 4 wherein there is a user account for each of the at least one user printers.

6. The method of claim 4 wherein there is one user account for multiple user printers.

7. The method of claim 1 wherein the net effect value is derived from one or more elements of the group consisting of:
  paper cost, ink cost, adhesive cost, binding cost, data transmission cost, publisher cost, advertising credits, time of printing, day of printing, user demographics, past history and an arbitrary value.

8. The method of claim 1 wherein the step of updating the account balance of the at least one user account involves debiting or crediting the at least one user account for at least one of the following:
  access debit;
  click through credits; or
  purchase credits.

9. The method of claim 1 wherein the computer system further comprises at least two entities and the net effect value is determined by adding at least two credits or debits charged by at least two entities.

10. The method of claim 1 wherein the computer system further comprises at least one entity and the net effect value is an aggregate of multiple debits or credits aggregated by one entity.

11. The method of claim 1 wherein once the step of modifying the document has been performed once, every document which has a negative net effect value is modified before being supplied to the user until the respective user account is above a second threshold.

12. The method of claim 11 wherein the second threshold is above the first threshold.

13. The method of claim 1 wherein if a user has multiple accounts and one of the accounts falls below the respective first threshold, the step of modifying a documents supplied is performed for all of the user's accounts.

14. The method of claim 1 wherein the step of supplying the document to the user further comprises adding the net value of the document to at least one of the user's accounts.

15. The method of claim 1 wherein if a user has multiple accounts and one of the accounts falls below the respective first threshold, the step of prohibiting supply of a document is performed for all of the user's accounts.

16. A method in a computer system for controlling the supply of a documents to a user, the system having a communication network, the document having an associated net effect, the net effect having either a positive, negative or zero value, the method including the steps of:
  (a) storing on a computer readable medium at least one user account associated with the user, the at least one user account having an account balance and a first threshold;
  (b) determining the balance of the at least one user account stored on the computer readable medium;
  (c) if the account balance of the at least one user account stored on the computer readable medium, as determined in step (b), is equal to or greater than the first threshold, the method further includes the steps of:
    (i) supplying the documents to the user via a communication networks; and
    (ii) updating the account balance of the at least one user account based on the net effect of the document supplied;
  (d) if the account balance of the at least one user account stored on the computer readable medium, as determined in step (b), is less than the first threshold, the method further includes the step of:
    (i) prohibiting the supply of the document to the user.

17. The method of claim 16 wherein the document is supplied to the user in electronic form via the communication network.

18. The method of claim 16 wherein the document is supplied to the user in printed form via at least one printer in communication with the communication network.

19. The method of claim 18 wherein the at least one printer is at least one user printer.

20. The method of claim 19 wherein there is a user account for each of the at least one user printers.

21. The method of claim 19 wherein there is one user account for multiple user printers.

22. The method of claim 16 wherein the net effect value is derived from one or more elements of the group consisting of:
  paper cost, ink cost, adhesive cost, binding cost, data transmission cost, publisher cost, advertising credits, time of printing, day of printing, user demographics, past history and an arbitrary value.

23. The method of claim 16 wherein the step of updating the account balance of the at least one user account involves debiting or crediting the at least one user account for at least one of the following:
  access debit;
  click through credits; or purchase credits.

24. The method of claim 16 wherein the computer system further comprises at least two entities and the net effect value is determined by adding at least two credits or debits charged by at least two entities.

25. The method of claim 16 wherein the computer system further comprises at least one entity and the net effect value is an aggregate of multiple debits or credits aggregated by one entity.

26. The method of claim 16 wherein if a user has multiple accounts and one of the accounts falls below the respective first threshold, the step of prohibiting supply of a document is performed for all of the user's accounts.

27. A method in a computer system for controlling the supply of a document to a user, the system having a communication network, the document having an associated net effect, the net effect having either a positive, negative or zero value, the method including the steps of:
  (a) storing on a computer readable medium at least one user account associated with the user, the at least one user account having an account balance and a first threshold;
  (b) determining the balance of the at least one user account stored on the computer readable medium;

(c) if the account balance of the at least one user account stored on the computer readable medium, as determined in step (b), is equal to or greater than the first threshold, the method further includes the steps of:
  (i) supplying the documents to the user via the communication network; and
  (ii) updating the account balance of the at least one user account based on the net effect of the document supplied;
(d) if the account balance of the at least one user account stored on the computer readable medium, as determined in step (b), is less than the first threshold, the method further includes the steps of:
  (i) determining the net effect of the document and, if the net effect of the document is negative, the method further includes the step of:
    (1) prohibiting supply of the document to the user.

28. The method of claim 27 wherein the document is supplied to the user in electronic form via the communication network.

29. The method of claim 27 wherein the document is supplied to the user in printed form via at least one printer in communication with the communication network.

30. The method of claim 29 wherein the at least one printer is at least one use printer.

31. The method of claim 30 wherein there is a user account for each of the at least one user printers.

32. The method of claim 30 wherein there is one user account for multiple user printers.

33. The method of claim 27 wherein the net effect value is derived from one or more elements of the group consisting of:
  paper cost, ink cost, adhesive cost, binding cost, data transmission cost, publisher cost, advertising credits, time of printing, day of printing, user demographics, past history and an arbitrary value.

34. The method of claim 27 wherein the step of updating the account balance of the at least one user account involves debiting or crediting the at least one user account for at least one of the following:
  access debit;
  click through credits; or
  purchase credits.

35. The method of claim 27 wherein the computer system further comprises at least two entities and the net effect value is determined by adding at least two credits or debits charged by at least two entities.

36. The method of claim 27 wherein the computer system further comprises at least one entity and the net effect value is an aggregate of multiple debits or credits aggregated by one entity.

* * * * *